United States Patent
Donovan et al.

(10) Patent No.: US 8,608,220 B2
(45) Date of Patent: Dec. 17, 2013

(54) VEHICLE SEPARATING PANEL ASSEMBLY WITH ACCESS TO TRUNK RELEASE

(75) Inventors: Gregory T. Donovan, Britton, MI (US); Michael A. Zielinski, Novi, MI (US); Shotaro Tani, Miyoshigaoka Miyoshi (JP); Charles P. Patterson, New Boston, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/435,824

(22) Filed: Mar. 30, 2012

(65) Prior Publication Data

US 2013/0257079 A1    Oct. 3, 2013

(51) Int. Cl.
    *B60N 3/00*    (2006.01)

(52) U.S. Cl.
    USPC ........................................ 296/24.43

(58) Field of Classification Search
    USPC ........... 296/24.43, 146.16, 201, 100.03, 106, 296/107.08, 107.15, 107.17, 108, 37.1, 296/37.16; 206/434; 150/166; 280/730.2; 224/315, 404
    See application file for complete search history.

(56) References Cited

U.S. PATENT DOCUMENTS

| | | | |
|---|---|---|---|
| 5,628,543 A | 5/1997 | Filipovich et al. | |
| 6,018,292 A * | 1/2000 | Penny, Jr. ................. | 340/426.29 |
| 6,026,705 A | 2/2000 | Ficyk et al. | |
| 6,135,514 A * | 10/2000 | Kowalewski et al. ......... | 292/216 |
| 7,152,899 B2 | 12/2006 | Hazlewood et al. | |
| 7,195,297 B2 * | 3/2007 | Murray et al. ............... | 296/24.4 |
| 7,300,085 B2 * | 11/2007 | Giumelli .................... | 296/24.43 |
| 7,566,094 B2 * | 7/2009 | Polewarczyk et al. ... | 296/190.11 |
| 7,669,907 B2 * | 3/2010 | Spater et al. ............... | 296/24.46 |
| 7,717,484 B2 * | 5/2010 | Parle et al. .................. | 296/24.4 |
| 7,758,092 B2 * | 7/2010 | Kolpasky et al. ........... | 296/37.5 |
| 8,172,296 B2 * | 5/2012 | Umeda et al. ............. | 296/24.44 |
| 8,177,275 B2 * | 5/2012 | Willis et al. ................ | 296/24.43 |
| 8,393,642 B2 * | 3/2013 | Nakaya et al. .............. | 280/751 |
| 2003/0071479 A1 * | 4/2003 | Schaller et al. .............. | 296/136 |
| 2006/0255610 A1 * | 11/2006 | Bejin et al. .................... | 296/37.1 |
| 2007/0210597 A1 * | 9/2007 | Wang ........................ | 296/24.43 |
| 2008/0023978 A1 * | 1/2008 | Luik .......................... | 296/24.43 |
| 2009/0033115 A1 * | 2/2009 | Zaiser et al. ................ | 296/24.43 |
| 2009/0127880 A1 * | 5/2009 | Willis et al. ................ | 296/24.43 |
| 2010/0066114 A1 * | 3/2010 | Winget et al. .............. | 296/24.43 |
| 2010/0264681 A1 * | 10/2010 | Rori et al. ................... | 296/24.43 |
| 2011/0148134 A1 * | 6/2011 | Gerhardt et al. ........... | 296/24.43 |
| 2011/0241372 A1 * | 10/2011 | Kusu ......................... | 296/24.43 |
| 2011/0260484 A1 * | 10/2011 | Takemura .................. | 296/24.43 |
| 2011/0266822 A1 * | 11/2011 | Takemura .................. | 296/24.43 |
| 2012/0256437 A1 * | 10/2012 | Cha et al. ................... | 296/24.43 |

* cited by examiner

*Primary Examiner* — Kiran B Patel
(74) *Attorney, Agent, or Firm* — Brinks Gilson & Lione

(57) ABSTRACT

Disclosed is a separating panel assembly for a vehicle with a rear trunk. An opening is defined in a portion of a separating panel and an access chute is located adjacent to the opening and leads into the trunk. A trunk release handle is located relative to the access chute such that the access chute guides a hand inserted from the passenger compartment through the opening to the trunk release handle. The opening is further located behind a foldable armrest when the armrest is folded up. A movable cover may be provided to cover the opening and reduce air flow between the trunk and the passenger compartment.

13 Claims, 3 Drawing Sheets

VEHICLE SEPARATING PANEL ASSEMBLY WITH ACCESS TO TRUNK RELEASE

BACKGROUND

1. Field of the Invention

The present invention relates access to the trunk of an automotive vehicle, and more specifically relates to access to the trunk from within the passenger compartment of the vehicle.

2. Description of Related Technology

A trunk of an automotive passenger vehicle is usually the vehicle's main cargo compartment. The trunk is located at the rear of the vehicle, and in sedan-type vehicles, the trunk is separated from the passenger compartment. To increase the flexibility of the trunk load space, the addition of folding rear seats increases the size of the trunk and so allows the occasional transportation of luggage that would have otherwise required a much larger vehicle. Beginning with the 2002 model year, a glow-in-the-dark trunk release was required inside the trunk of all U.S. vehicles with separate trunks. This was done in order to provide an escape for persons locked in the trunk.

Some cars currently include the ability to remotely open the trunk from the outside or from inside the passenger compartment. This may be achieved through a variety of options, for example through an electronic release switch for the trunk's latch, which may cause the trunk lid to raise or merely unlatch. These options typically require an electric power supply.

It is desirable to provide a mechanism for opening of the trunk from the passenger compartment of the vehicle, even if the vehicle ignition is turned off and no electric power supply is available.

SUMMARY OF THE INVENTION

The present invention provides a separating panel assembly with an opening through a portion of a separating panel and with an access chute adjacent to the opening on a side of the separating panel facing the trunk. The access chute is configured to guide a person's hand, which has been inserted into the opening from the passenger compartment, to a trunk release handle located adjacent to the access chute.

In one aspect of the invention, the opening is configured to be located behind a foldable armrest when the armrest is folded up.

According to another aspect of the invention, the opening may have a cover, the cover being movable for uncovering the opening. Such a cover may be hinged or flexible and inhibits air flow from the trunk into the passenger compartment. A flap made of elastomeric material resists permanent deformation.

According to a further aspect of the invention, the opening may be framed by a plastic bezel on a side facing the passenger compartment. The bezel provides a suitable fastening location for the cover.

According to yet another aspect of the invention, the chute may extend primarily in a horizontal, rearward direction, relative to the vehicle, from the opening. The chute may have a bottom wall primarily extending in a horizontal plane and two primarily vertical side walls located adjacent to the bottom and extending substantially parallel to each other. This arrangement guides an inserted hand toward the trunk release handle. A top wall may be added depending on spatial conditions inside the trunk. Accordingly, the chute inhibits contact between the hand and other devices located inside the trunk and that are laterally or vertically outside or beside the chute.

Therefore, the chute defines a channel with a bottom wall and a top wall, the chute being arranged in a position with the trunk release handle within a projected cross-section of the channel.

In another aspect of the invention, the separating panel itself may be foldable about a bottom hinge configured for folding the separating panel down into the passenger compartment.

Further, the separating panel may be laterally attached to a back rest of an adjacent seat and hingable with the back rest into the passenger compartment.

DETAILED DESCRIPTION OF THE DRAWINGS

Figure 1:
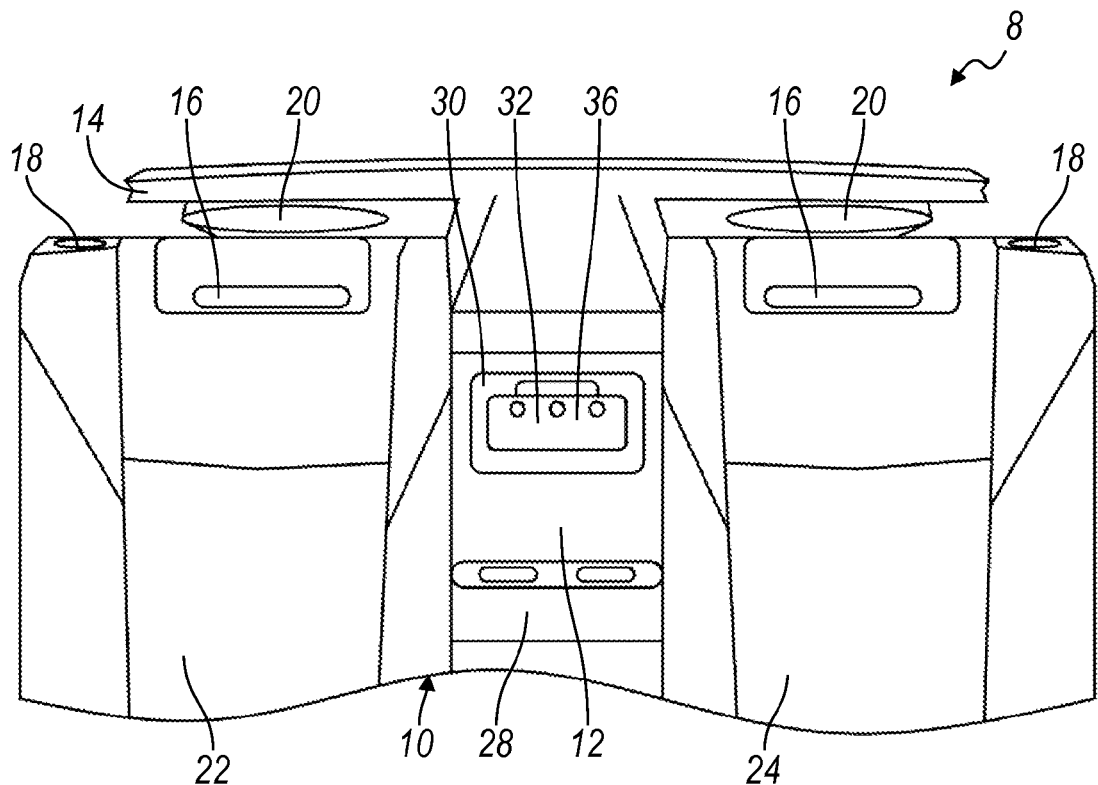
FIG. 1 shows an illustrative example of a separating panel assembly according to one embodiment of the invention incorporated in the rear portion of a vehicle passenger compartment.

Referring to FIG. 1, a separating panel assembly 8 is illustrated as it presents itself when viewed rearward from within a passenger compartment 13 of the vehicle. The separating panel assembly 8 includes a separating panel 10 that separates the passenger compartment 13 from the vehicle's trunk 11, which is located behind the separating panel 10.

Figure 3:
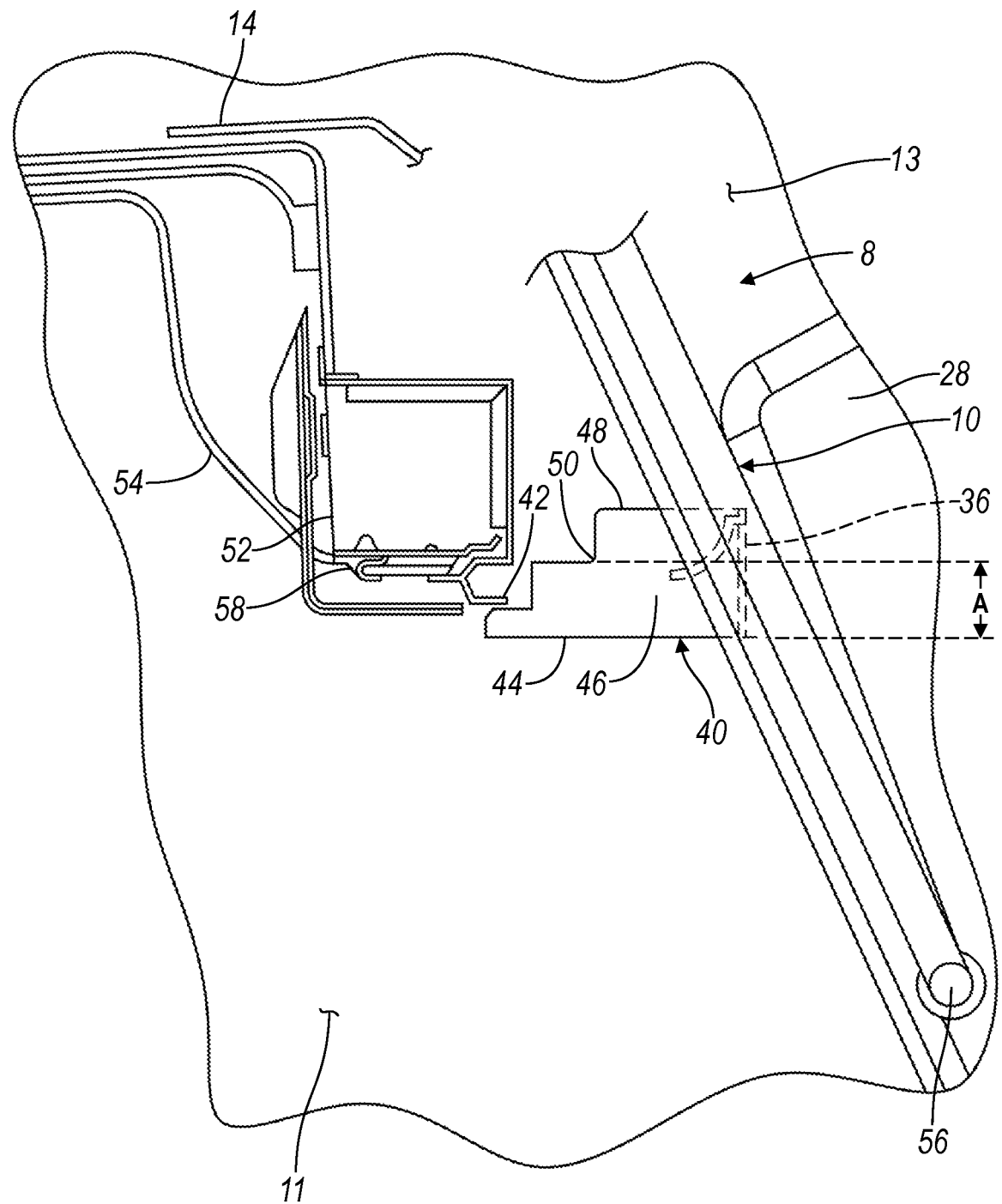
FIG. 3 shows a side view of an access chute and an emergency trunk release handle according to the principles of the invention.

The separating panel 10 generally includes a substantially vertical portion 12 located between two back rests 22 and 24 of two back seats of the vehicle. The substantially vertical portion 12 may be connected to a substantially horizontal portion 14 and may be manufactured of stamped sheet metal or an alternative material, such as a variety of plastics, particularly reinforced plastics. The back rests 22 and 24 may include various openings, for example head rest apertures 16 for accommodating adjustment rods of head rests associated with rear seats. The horizontal portion 14 may also have openings 18 and 20, such as openings to receive a back rest release or loudspeakers. Although the separating panel 10 is depicted as one piece in FIG. 1, it is contemplated that the separating panel 10 may be assembled from several separate parts and may be configured not to include the horizontal portion 14. The vertical portion 12 of the separating panel 10 forms a center back rest between the back rests 22 and 24 and is configured for accommodating a hingeably mounted armrest 28 (seen as hinge 56 in FIG. 3) between the back rests 22 and 24. The vertical portion 12 is hidden behind the armrest 28 when the armrest 28 is folded upward (as seen in FIG. 3) so that it forms a generally planar continuous back rest surface with the back rests 22 and 24 arranged on both lateral sides of the vertical portion 12. When the armrest 28 is folded down (seen in FIG. 1) to support an arm, a bezel 30 in the vertical portion 12 is revealed that has a central opening 32. In the depicted embodiment, the central opening 32 has a rectangular shape with rounded corners. This shape is only one example out of many possibilities, and the central opening 32 may be round or oval or have any other shape suitable for insertion of a human hand.

The separating panel 10 may be hingable forward about a bottom hinge to provide an opening with a large cross-section between the passenger compartment 13 and the vehicle's trunk 11 for transporting large items. Also, the separating panel 10 may have a vertical off-center split between back rest 22 and vertical portion 12 or between back rest 24 and vertical portion 12, or both, so that two or more separately hingable portions may be formed. This allows folding an individual back rest 22 or 24, or one of the back rests 22, 24 and the vertical portion 12, forward into the passenger compartment to provide an enlarged opening between the passenger compartment and the vehicle's trunk while retaining the other one of the back rests 22 and 24 upright for seating a passenger.

Figure 2:
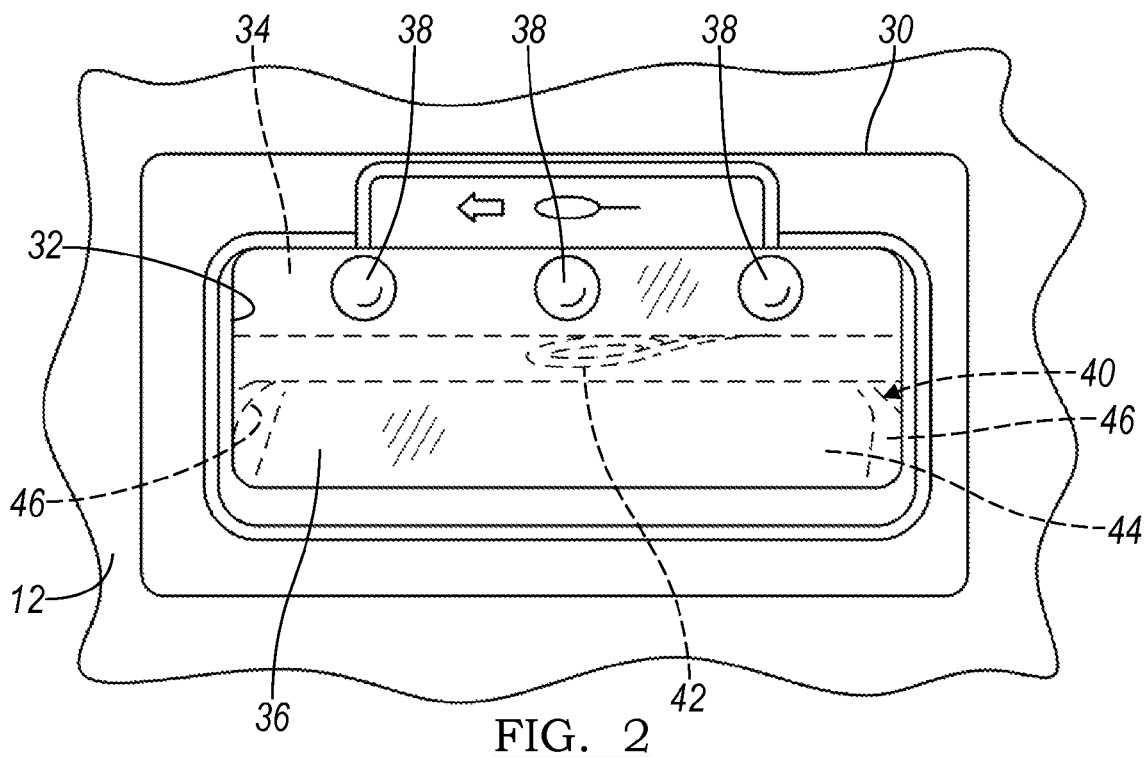
FIG. 2 is an enlarged view of a portion of the separating panel assembly shown in FIG. 1.

FIG. 2 shows the bezel 30 and the central opening 32 in greater detail. Along the top of central opening 32, a fastening strip 34 is formed on the bezel 30. The fastening strip 34 is indicated by a broken line because it is concealed by a flap 36 that substantially covers the central opening 32. The flap 36 is made of a flexible polymer material and affixed to the fastening strip 34 via three snap connectors 38. While the drawing shows three snap connectors 38, any number of two or more would be suitable as well. Also, for attaching the flap 36, plastic rivets, or other suitable attachment techniques, including the use of adhesive or a melting process, such as ultrasonic welding, can be used for forming spots or lines connecting the flap 36 with the fastening strip 34. Furthermore, the flap 36 may be rigid and hingeably mounted. In the shown embodiment, the flap 36 is sufficiently flexible to bend into or out of the central opening 32, thereby allowing access to an access chute 40 leading rearward into the trunk 11 of the vehicle. The flap 36 may be made of elastomeric material for avoiding permanent deformation upon use. The material may also be opaque or transparent. By providing the flap 36 over the opening 32, the flap 36 minimizes air flow from the trunk 11 to the passenger compartment 13, while at the same time allowing easy access to the central opening 32 and the access chute 40. The access chute 40 may be manufactured of thermoplastic material and may also be integral or unitarily formed with the bezel 30 and secured to the separating panel 10. The access chute 40 may move with the separating panel when the separating panel 10 is folded down, as discussed above. Alternatively, the access chute 40 may be detachable from the separating panel 10.

Behind the flap 36, near the rearward end of the access chute 40, a trunk release handle 42 is located. The trunk release handle 42 is positioned adjacent to the access chute 40 such that it is within reach of a hand inserted into the central opening 32 by bending the flap 36 inward or outward. In the figures, the release handle 42 is actuated by pulling the handle 42 to the left.

FIG. 3 shows a side view of the separating panel assembly 8, including the separating panel 10 and the access chute 40, from the right side of the vehicle so that the front of the vehicle is on the right side of the drawing and the rear of the vehicle is on the left side of the drawing. The access chute 40 extends from the rear side of the separating panel 10 in a generally horizontal direction and defines a channel having a substantially horizontal bottom 44 flanked by two adjacent side walls 46, of which only one is visible in this view. A top wall 48 connects the top edges of the side walls 46. In the shown embodiment, the top wall 48 does not extend in a straight horizontal plane over its entire length, but rather is stepped at 50 with a lowered height toward the rear of the vehicle. The step 50 lowers the height of the access chute 40 to guide the inserted hand downward underneath a frame duct 52 that is arranged crosswise generally between the passenger compartment 13 and the trunk 11 and provides rigidity to the vehicle frame and allows routing of electrical lines or conduits. While the bottom wall 44 extends rearward partly underneath the frame duct 52, the top wall 48 is shorter than the bottom wall 44 and ends before reaching the frame duct 52. In the embodiments, the top wall 48 of the access chute 40 may extend as far as the bottom wall 44, may be straight, have a slope or a curvature, or may be omitted entirely, depending on spatial conditions inside the trunk and the location of the opening 32 in the separating panel 10.

A push-pull cable 54, with a core wire and a tubular cover, is guided forward with respect to the vehicle from a trunk lock latch (not shown) along a side wall of the trunk, along the underside of the horizontal portion 14, and to an anchor bracket 58 located within a rearward projection of the cross-section of the access chute 40. The trunk release handle 42 is fixedly connected to the core of the push-pull cable 54 and positioned mostly underneath the frame duct 52, preferably near the front side of the frame duct 52. Pulling the trunk release handle 42 disengages the trunk lock latch, thereby opening or at least unlocking the trunk lid. The trunk release handle 42 may have a dual function as an emergency trunk release that is accessible from inside the trunk to enable persons locked in a trunk to escape. But it is also within the scope of the present invention that a separate emergency trunk release may be provided in addition to the trunk release handle 42.

As illustrated in FIG. 3, the trunk release handle 42 is preferably located within a rearward projection of cross-section A of the channel, which is formed by the access chute 40. It is optional to place the trunk release handle inside the access chute 40. Even if the trunk release handle 42 is located beyond the rearward end of the access chute 40, extending a hand into the access chute 40 preferably leads easily to a contact with the trunk release handle 42 due to the geometrical arrangement of the access chute 40 and the trunk release handle's position adjacent to the access chute 40. In the shown embodiment, the position of the trunk release handle 42, indicated with an arrow, is at a height closer to the bottom wall 44 than to the top wall 48 of the access chute 40. A hand gliding rearward along the straight bottom 44 is guided directly toward the trunk release handle 42. Such a location makes accessing the trunk release handle through the opening easy, even if the trunk release handle is not directly visible to the person inserting their hand into the central opening 32.

Figure 4:
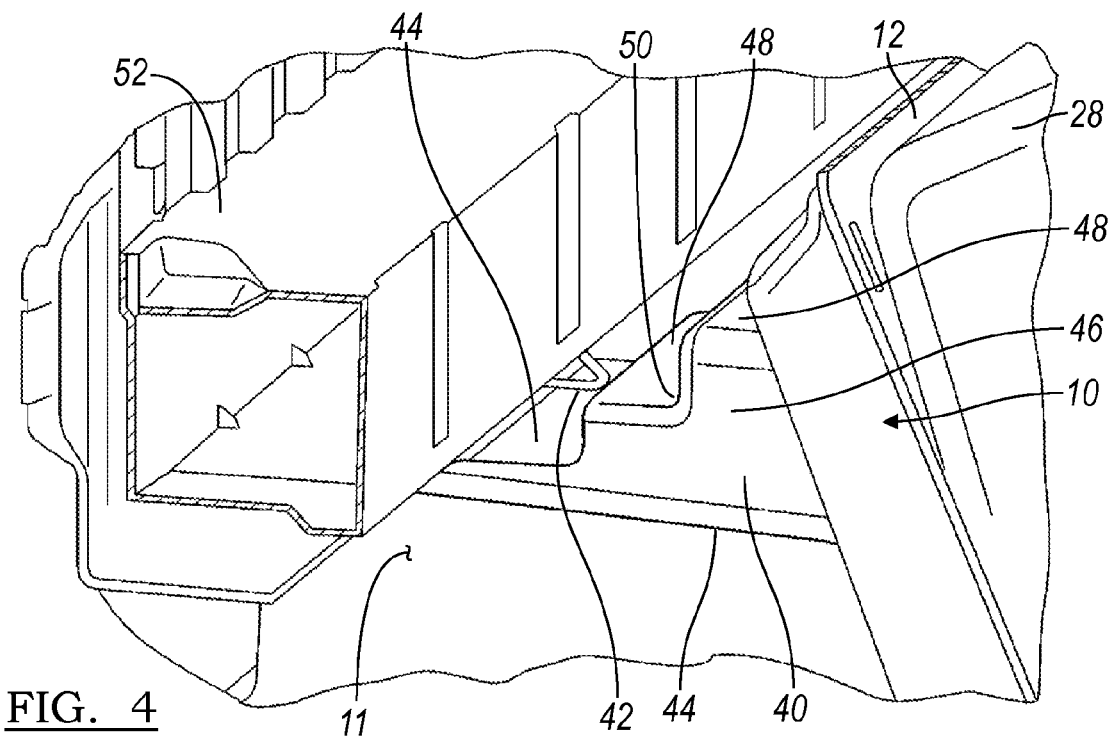
FIG. 4 is a perspective view of the access chute and emergency trunk release handle seen in FIG. 3.
Figure 5:
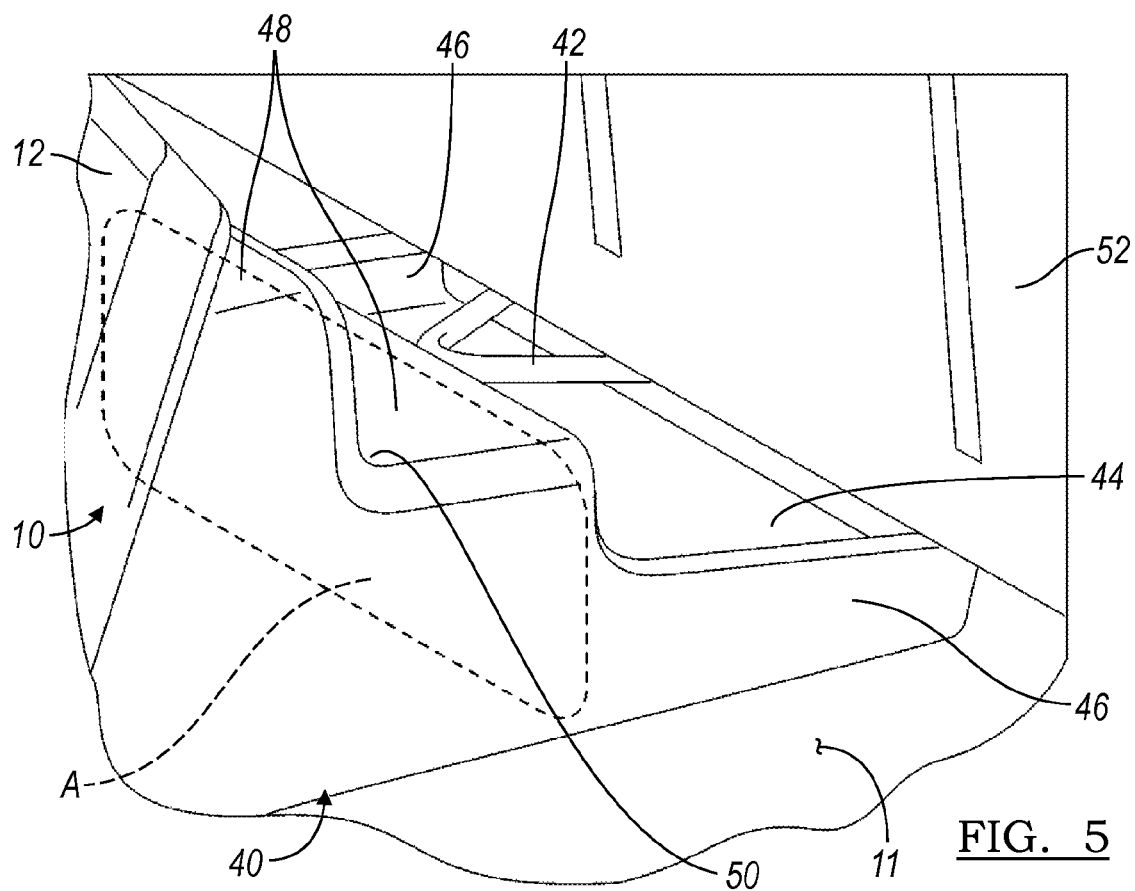
FIG. 5 is a perspective view of the emergency trunk release handle and access chute when viewed in a forward direction from within the trunk.

FIGS. 4 and 5 show different perspective views of the access chute 40. FIG. 4 shows the access chute 40 from the passenger side of the vehicle, looking slightly rearward and downward. FIG. 5 shows a similar perspective from the driver side of the vehicle, but from a closer viewing position. As evident from FIG. 4, and particularly FIG. 5, the trunk release handle 42 is located beneath the frame duct 52 and protrudes slightly beyond the front edge of the frame duct 52 to form a horizontal loop at a height between the top wall 48 and the bottom wall 44 of the access chute 40, within the projection of the cross-section A of the access chute 40.

Both FIGS. 3 and 4 show portions of the armrest 28 in a folded-up position that covers the central opening 32. For access to the central opening 32, the armrest 28 can be folded down, about the hinge 56, thereby revealing the vertical portion 12 of the separating panel 10.

While the figures depict the trunk release handle 42 as a loop, other shapes are within the scope of the present invention, such as T handles or pivoting arrangements. Also, mechanical linkages other than push-pull cables can be used to transfer an actuation of the trunk release handle to the trunk lock. The push-pull cable 54 provides the benefit of simple flexible installation along the side of the trunk where it does not interfere with the storage area of the trunk.

The invention may be embodied in other forms without departing from the spirit or novel characteristics thereof. The embodiments disclosed in this application are to be considered in all respects as illustrative and not limiting. Furthermore, details described in connection with one embodiment may be adapted to be implemented in a different embodiment. The scope of the invention is indicated by the appended claims rather than by the foregoing description; and all changes which come within the meaning and range of equivalency of the claims are intended to be embraced therein.

What is claimed is:

1. A separating panel assembly for an automotive vehicle of the type having a passenger compartment and a trunk located behind the passenger compartment, the separating panel assembly positioned between the passenger compartment and the trunk and comprising:
    a separating panel extending upwardly relative to the orientation of the vehicle;
    an opening defined through a portion of the separating panel;
    an access chute extending from the opening and arranged on a side of the separating panel toward the trunk, the access chute being configured to guide a hand inserted through the opening into the access chute from the passenger compartment; and
    a trunk release handle positioned adjacent to the access chute.

2. The separating panel assembly of claim 1, further comprising a foldable armrest coupled to the separating panel wherein the opening is located behind the foldable armrest when the armrest is located in an up position.

3. The separating panel assembly of claim 1, further comprising a cover covering the opening, the cover being movable for uncovering the opening.

4. The separating panel assembly of claim 3, wherein the cover is made of a flexible material and bendable for uncovering the opening.

5. The separating panel assembly of claim 4, wherein the cover is a rigid flap.

6. The separating panel assembly of claim 3, wherein the opening is framed by a bezel located on a side of the separating panel facing toward the passenger compartment.

7. The separating panel assembly of claim 6, wherein the cover is fastened to the bezel.

8. The separating panel assembly of claim 1, wherein the access chute extends substantially in a horizontal, rearward direction from the opening.

9. The separating panel assembly of claim 8, wherein the access chute further comprises a bottom wall extending in a generally horizontal plane and two generally vertical side walls adjacent to the bottom wall and extending substantially parallel to each other.

10. The separating panel assembly of claim 9, wherein the access chute further comprises a top wall opposite the bottom wall and connecting the vertical side walls.

11. The separating panel assembly of claim 10, wherein the top wall extends rearward from the separating panel by a shorter distance than the bottom wall.

12. The separating panel assembly of claim 8, wherein the access chute is configured to inhibit contact between a hand inserted therein and objects located inside the trunk that are generally laterally or vertically outside the access chute.

13. The separating panel assembly of claim 1, wherein the access chute defines a channel with a bottom wall and a top wall, the access chute being arranged in a position relative to the trunk release handle such that the trunk release handle is positioned within a projected cross-section of the channel.

* * * * *